United States Patent
Fazion

(10) Patent No.: US 8,763,274 B2
(45) Date of Patent: Jul. 1, 2014

(54) SUPPORT ELEMENT FOR PIECES OF PASTA AND PASTA WORKING PLANT PROVIDED WITH SUCH SUPPORT ELEMENT

(75) Inventor: Doriano Fazion, Verona (IT)

(73) Assignee: Aldino S.R.L. (IT)

( * ) Notice: Subject to any disclaimer, the term of this patent is extended or adjusted under 35 U.S.C. 154(b) by 668 days.

(21) Appl. No.: 12/629,157

(22) Filed: Dec. 2, 2009

(65) Prior Publication Data

US 2010/0139117 A1    Jun. 10, 2010

(30) Foreign Application Priority Data

Dec. 5, 2008 (IT) ............................. VR2008A0134

(51) Int. Cl.
  *F26B 11/18* (2006.01)
(52) U.S. Cl.
  USPC .................. 34/661; 34/238; 34/239
(58) Field of Classification Search
  USPC ............ 34/661, 237, 238, 239, 215, 216, 217
  See application file for complete search history.

(56) References Cited

U.S. PATENT DOCUMENTS

| 1,572,849 A | 2/1926 | Secord |
| 1,692,294 A | 11/1928 | Elder |
| 2,198,362 A | 4/1940 | Bailey |
| 2,274,104 A | 2/1942 | Stanley |
| 2,300,317 A | 10/1942 | Scherer |
| 2,309,259 A * | 1/1943 | Seigh .............. 34/239 |
| 3,051,296 A | 8/1962 | Mertz |
| 3,192,648 A | 7/1965 | Seedorf |
| 5,062,221 A * | 11/1991 | Fazion ............. 34/204 |

FOREIGN PATENT DOCUMENTS

| DE | 603 786 C | 10/1934 |
| DE | 16 04 944 A1 | 4/1970 |
| EP | 0 381 001 A | 8/1990 |
| GB | 541 667 A | 12/1941 |
| GB | 1 318 875 A | 5/1973 |

OTHER PUBLICATIONS

European Search Report, dated Sep. 1, 2009, issued in corresponding Italian priority application No. VR20080134.

* cited by examiner

*Primary Examiner* — Jiping Lu
(74) *Attorney, Agent, or Firm* — Ostrolenk Faber LLP

(57) ABSTRACT

A pan-like support element designed to be hung, in use, for transporting sheet material throughout a sheet material working plant, is described. The support element includes at least one plate-like body for supporting the sheet material, a holding portion extending from a surface of the plate-like body, a hanger at the rear for engagement with dragging and support structure of the plant, and a holding portion including at least one lug rising from the plate-like body, or from a base element that is secured to it, and supports a top transverse element extending parallel to the plate-like body and transversal to the front-rear direction.

9 Claims, 4 Drawing Sheets

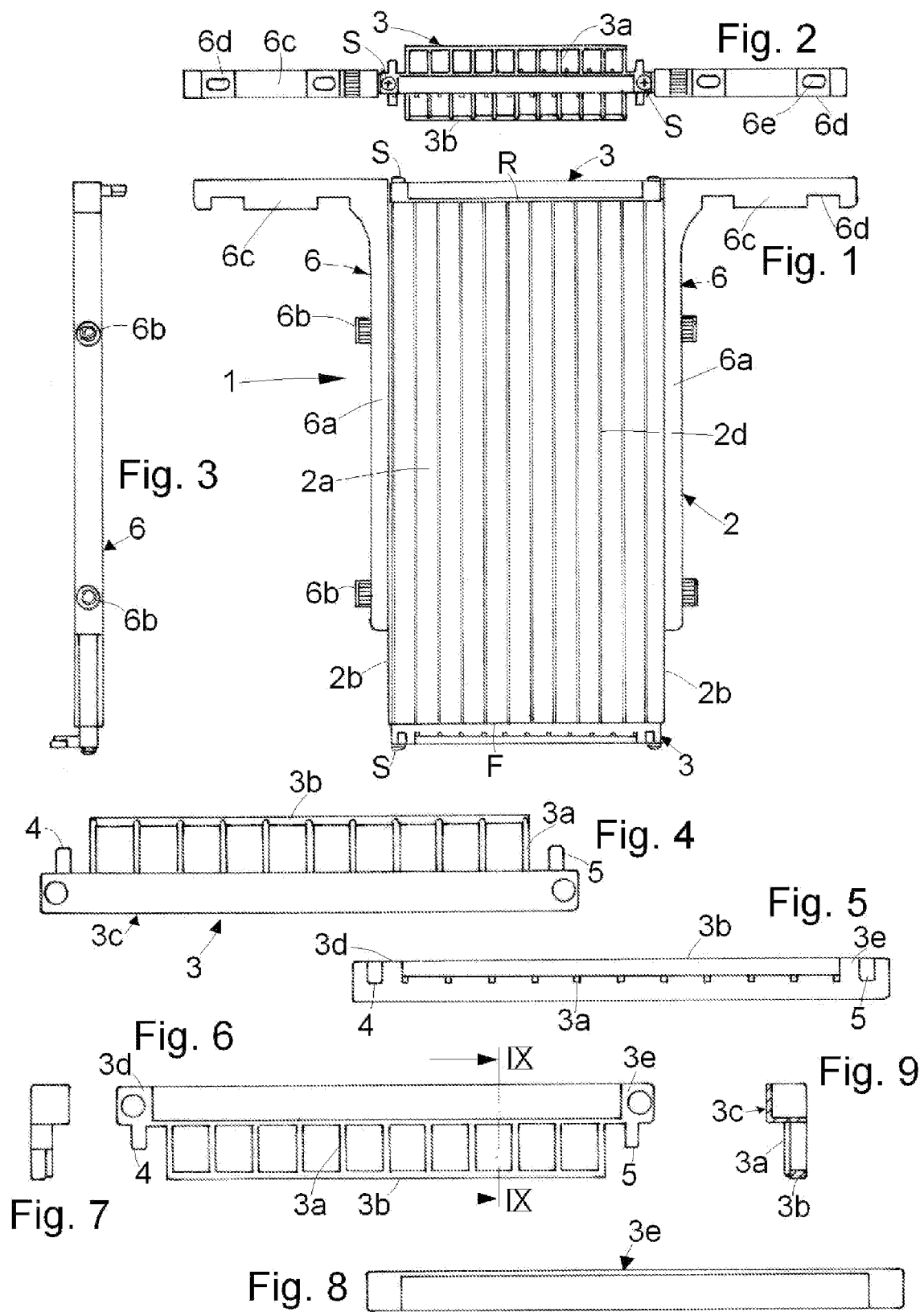

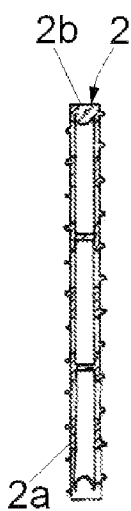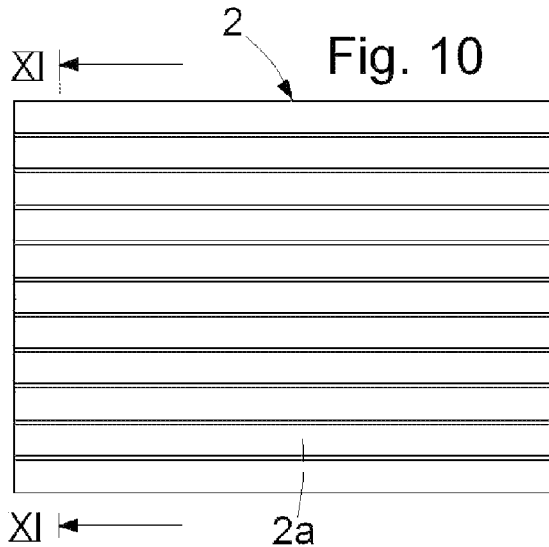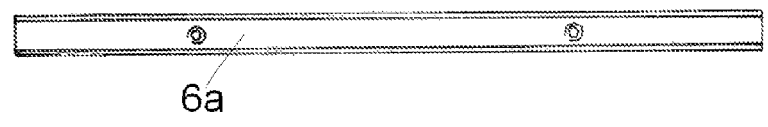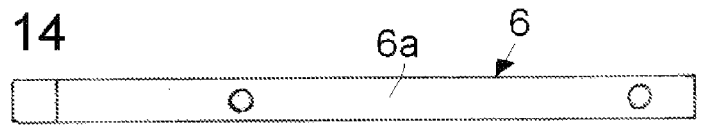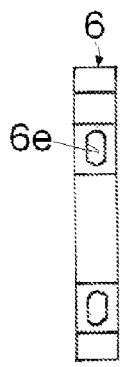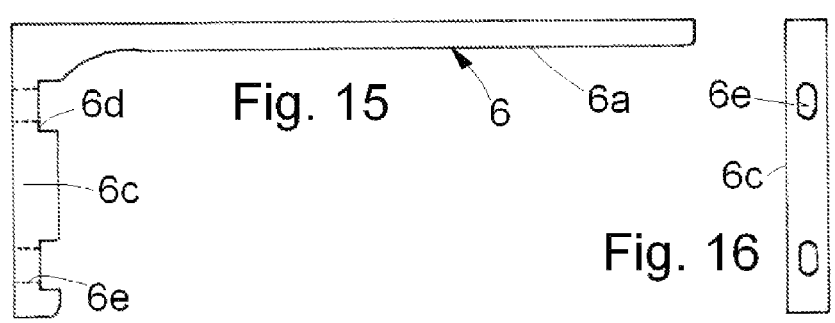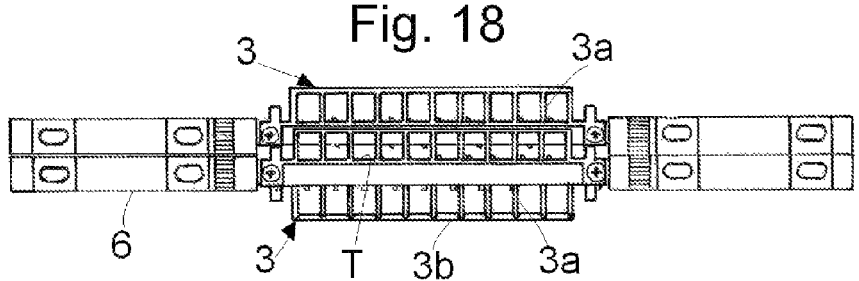

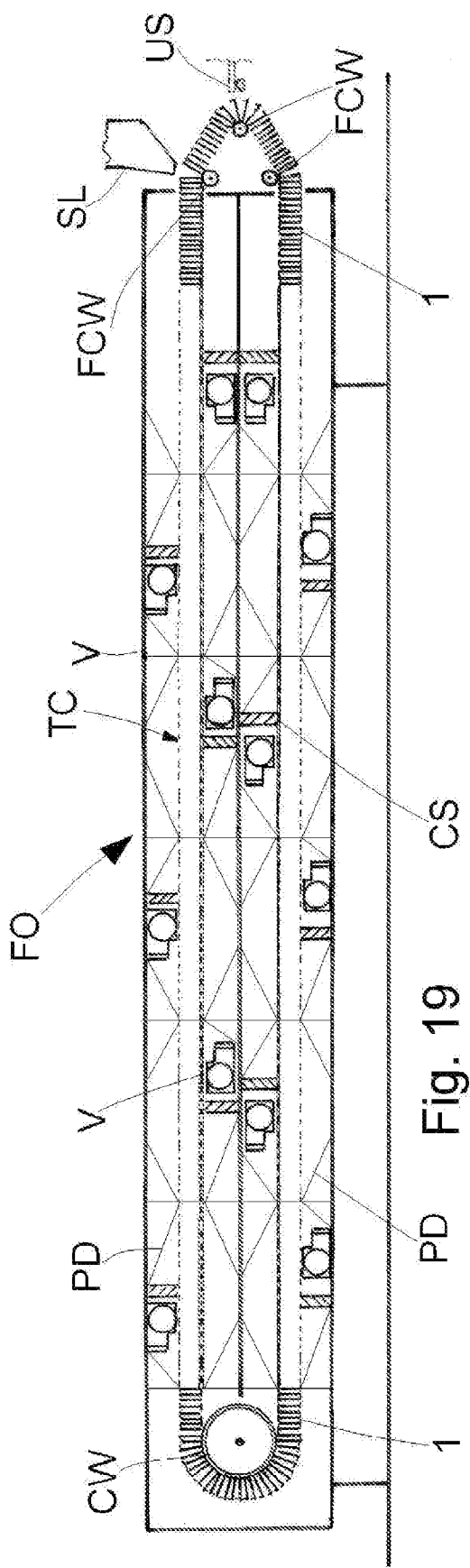
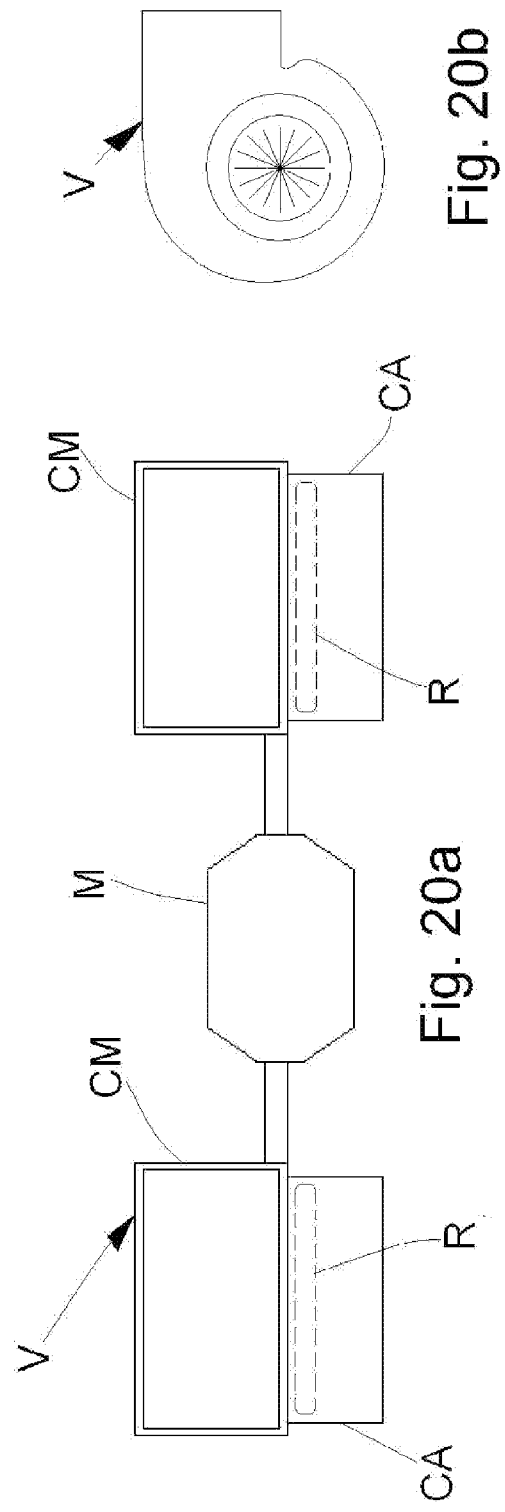
Fig. 19
Fig. 20a
Fig. 20b

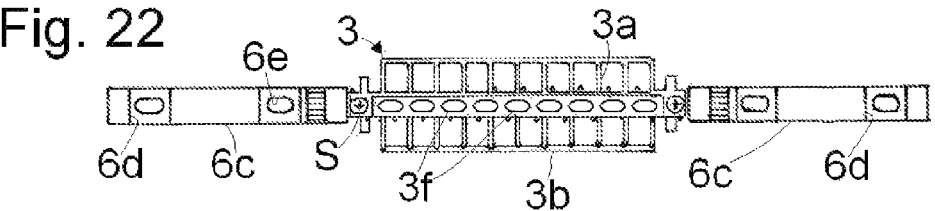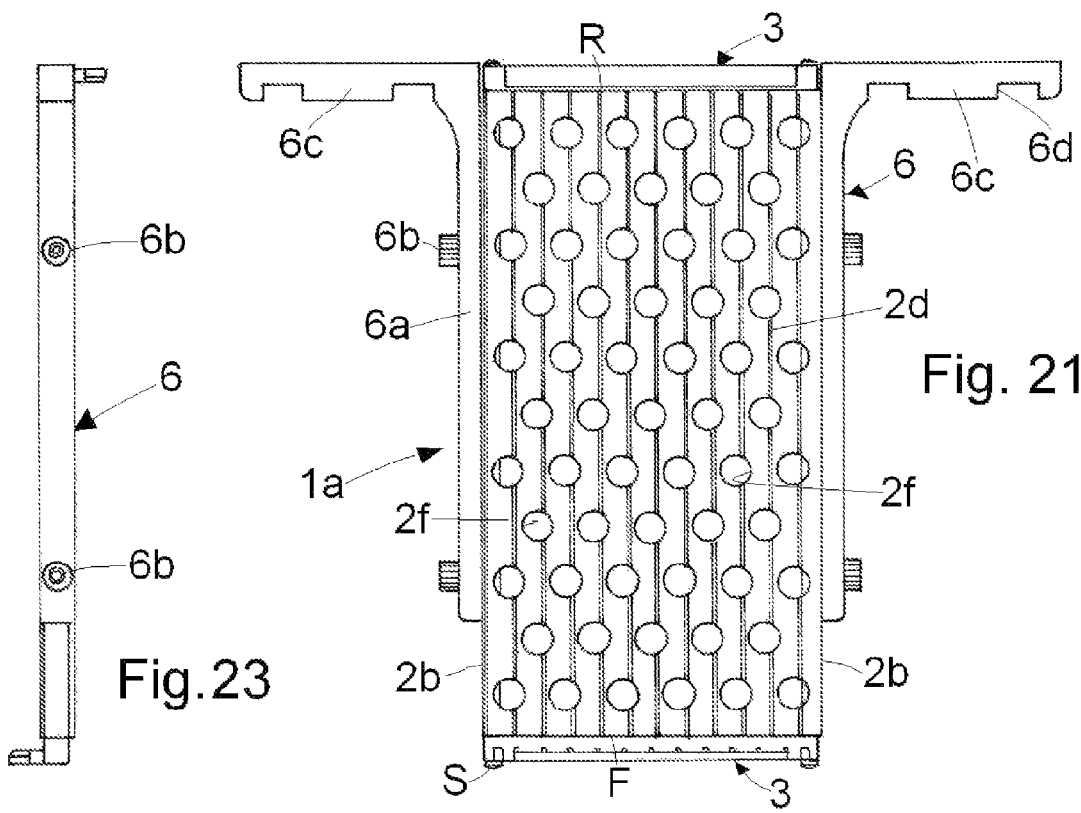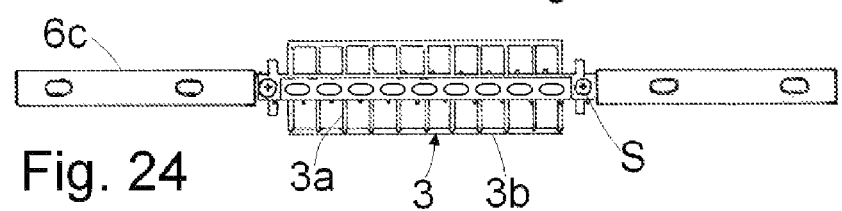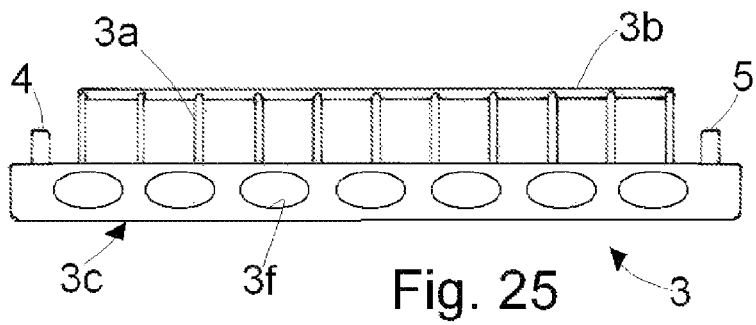

US 8,763,274 B2

SUPPORT ELEMENT FOR PIECES OF PASTA AND PASTA WORKING PLANT PROVIDED WITH SUCH SUPPORT ELEMENT

FIELD OF INVENTION

The present invention relates to a pan-like support element, particularly suitable for drying ovens, such as ovens designed to dry pasta and especially sheets of pastry, and a working plant including the such a support element.

BACKGROUND OF INVENTION

Automatic plants for kneading, rolling, cutting, drying and packaging pasta dough comprising a rolling group for obtaining dough sheets or foils, an oven for drying dough sheets or foils provided with a conveyor suitable for carrying the dough sheets loaded therein throughout the oven, a loading unit designed to load the dough sheets or foils onto the conveyor, and an extractor or unloading group designed to unload dried dough sheets from the conveyor, have already been proposed in the state of the art. Advantageously, the conveyor comprises a chain conveyor, i.e. a conveyor provided with a pair of chains running over a respective pair of sprocket wheels, the chains being designed to support a sequence of transversally extending pan-like support elements spaced apart from one another and each hung at one end thereof to one of the chains. The conveyor extends throughout the length of the oven and is usually designed to carry out a forward and a return stroke in the oven. The pan-like support elements are so shaped as to delimit a support and receiving space for one or more dough sheets between two adjacent pan-like support elements.

Dough sheets are loaded into a respective receiving space between two successive pan-like elements at a front end of the conveyor in order to take advantage of the fact that, while the conveyor chains run around a pair of sprocket wheels, the pan-like support elements, are angularly displaced from one another, thereby "opening" outwards. Moreover, still at the front end thereof the plant comprises an extractor group designed to unload dough elements or pieces that have been moved throughout the oven along a forward and a return run, downstream of the loading unit with respect to the direction of return movement of the conveyor.

Many types of pan-like support elements have been proposed.

EP-0 381 001 discloses pan-like or support elements, each comprising two foraminated plate-like elements which are spaced apart one with respect to the other, one end thereof being connected across the chains of the conveyor, whereas the other end thereof is free, thus the plate-like elements are free to be angularly displaced one with respect to the other. The shape of each pan-like support is such as to delimit a receiving space for dough to be dried between two successive pan-like supports. According to such a solution, dough sheets or pieces of lasagna located in the receiving space between two successive pan-like supports can be subjected to a drying air flow only in a direction substantially orthogonal to the plate-like elements, i.e. to the direction of the conveyor movement.

Pan-like elements have also been proposed, which comprise each a plate element with a series of end lugs extending in a direction substantially perpendicular to the plate-like element. The lugs are so dimensioned as to prevent the dough sheets from being discharged from the space delimited by two adjacent and contiguous plate-like elements. The dough sheets, upon being loaded on the pan-like supports, often slip off, or sometimes become stuck to the lugs, thus being liable to break or be damaged, and, even worse, this prevents dried lasagnas from being downloaded by being stuck to the pan-like support. Any failure in unloading the dried material results in the drying plant being stopped, manual intervention being required to remove any stuck material and cleaning any concerned pan-like support with consequent long dead times.

SUMMARY OF THE INVENTION

A main object of the present invention is to provide a pan-like support element for a drying plant for drying dough or plastically deformable sheet materials, on which one or more lengths of sheet material can be loaded without running the risk of breaking or damaging them and/or becoming stuck to a pan-like support.

Another object of the present invention is to provide a pan-like support element suitable for causing sheet material lengths loaded therein to be exposed to drying air flows in an optimum manner, and keeping them in a proper trim throughout the drying journey along the drying oven.

Another object of the present invention is to provide a drying plant provided with a conveyor comprising a sequence of pan-like support elements according to the present invention and suitable for receiving dough sheets, moving them along the drying plant, and unloading the dried material without drawbacks or the need of interventions of an operator.

These and other objects, that will better appear below, are achieved by a pan-like support element designed to be hung, in use, for transporting sheet material throughout a sheet material working plant, comprising:
  at least one plate-like body for supporting the sheet material, having a front and a rear;
  at least one holding portion extending from at least one surface of the at least one plate-like body,
  hanging means provided at the rear for engagement with dragging and support means of a plant for working sheet materials, and
  the at least one holding portion comprising at least one lug rising from the plate-like body, or from a base element secured thereto, and supports a top transverse element extending substantially parallely to the plate-like body and transversally to the front-rear direction thereof.

BRIEF DESCRIPTION OF THE FIGURES

Further aspects and advantages of the present invention will better appear from the following detailed description of preferred embodiments of a support element, illustrated by way of non-limiting example in the accompanying drawings, in which:

FIGS. 1 to 3 are plan, front, and side views, respectively, of a support element in accordance with the present invention;

FIGS. 4 to 8 are front, top, rear, side and bottom views, respectively, of a holding portion for the support element of FIGS. 1 to 3;

FIG. 9 is a cross-section view taken along the line IX-IX of FIG. 6;

FIGS. 10 and 11 are plan and side views, respectively, of a plate-like component of the support element of FIGS. 1 to 3;

FIG. 12 is a cross-section view taken along the line XII-XII of FIG. 10;

FIGS. 13 to 17 are side, plan, front and rear views, respectively, of a bracket for anchoring the support element of FIGS. 1 to 9 to a conveyor;

FIG. 18 is a front view of two packed support elements of FIGS. 1 to 3;

FIG. 19 is a diagrammatic view of an oven for a plant in accordance with the present invention;

FIGS. 20a and 20b are a front and side views, respectively, of a centrifugal fan suitable for the oven of FIG. 19;

FIGS. 21 to 24 are plan, front, side and rear views, respectively, of a support element according to another embodiment of the present invention;

FIG. 25 is a front view of the holding portion of the support element of FIGS. 21 to 24.

In the drawings, equivalent or similar parts or components are indicated with the same reference numerals.

DETAILED DESCRIPTION OF THE PREFERRED EMBODIMENTS

Referring now to the above-listed Figures, a pan-like element 1 is shown which is designed to be hung, in use, for transporting sheet material, such as dough sheets (lasagna) or the like, throughout a sheet material working plant, the pan-like element comprising a plate-like body 2, or a plurality of coplanar plate-like bodies arranged side by side, and a holding or receiving portion 3 located at each end of the pan-like element or of each pan-like element 1. Each holding or receiving portion 3 preferably comprises a plurality of straight lugs 3a, which extend parallel and aligned in the same direction orthogonal with respect to the plate-like body 2. Each plate-like body or coplanar plate-like bodies 2 comprise a front F and a rear R designed to be anchored to dragging and support elements, e.g. a chain conveyor of a plant for working sheet materials, as will be further explained below.

The pan-like support element further comprises hanging means 6 provided at the rear R of the pan-like support element for engagement with dragging and support means of a plant for working sheet materials.

Advantageously, the lugs 3a are integral with the plate-like body 2 or extend from a common base element 3c securable to the plate-like body 2, in any suitable way, e.g. by means of screws S.

The lugs 3a are connected at the top thereof by means of a transverse or cross-member 3b, which is preferably integral with the lugs 3a and the base element 3c and possibly with a respective plate-like body 2. In use, the cross-member 3b is substantially parallel to the plate-like body 2 and transversally to the plate-like body front F-rear R direction.

The lugs 3a are spaced apart from one another, thus delimiting together with the cross-member 3b and the plate-like body 2 openings or windows, whereby allowing drying air to flow parallely to the plate-like body, as will be further explained below.

In the embodiments in which the receiving portion 3 comprises a base element 3c from which a plurality of lugs 3a extend connected at the top thereof by the cross-member or transverse 3b, the base element 3c is anchorable in any suitable way, preferably in a removable way, e.g. by means of screws or the like, to a respective plate-like body 2.

Preferably, the base element 3c comprises a L-shaped intermediate section (FIG. 9) which is longer than the transverse 3b and terminates at the ends thereof with a closing block 3d and 3e, respectively. The lugs 3a connected at the top thereof by the cross-bar 3b extend from a wing of the L-shaped intermediate section, whereas a projecting portion, preferably a stake 4 and 5, respectively, fully similar, but shorter, e.g. half the height of a lug 3a, extends parallel to the lugs 3a from each end closing block 3d and 3e. The blocks 3d and 3e, in use, are designed to engage or abut against a respective block 3d, 3e or a stake 4, 5 of an adjacent base element 3c, and are preferably aligned with the lugs 3a.

A through hole is formed in each end block 3d and 3e having an longitudinal axis substantially perpendicular to the stakes 4 and 5 or the lugs 3a, the hole being designed to receive a fixing screw S, as indicated above.

Advantageously, the lugs 3a have the same width, and the transverse 3b has a width smaller than the lugs 3a. The transverse 3b is located at the head of the lugs, so as to be located on a same side thereof and to leave the top of each lug partly free (see FIGS. 1 and 5).

Preferably, each plate-like body 2 is a tubular flat member (see in particular FIGS. 10 to 12), e.g. obtained by extruding an aluminum alloy, and thus it has two main substantially flat walls 2a parallel to one another and two smaller flat walls 2b parallel to one another arranged to connect the main walls in order to delimit a through opening A with two end mouths at which a respective base element 3c is to be provided.

Advantageously, two holding portions 3 are provided on each plate element 2: one at each end or mouth thereof, and thus one at the front F and the other at the rear R, but arranged overturned with respect to one another, i.e. one has its lugs 3a extending in the direction of rising from a main wall of the plate-like body 2, whereas the other has its lugs 3a arising from the other main wall of the plate-like body 2.

Each plate-like body 2 can comprise one or a plurality of tubular flat elements arranged adjacent and coplanar, each having a respective holding portion 3 that can be integral with, or secured thereto at both ends thereof, as described above, thereby obtaining a quadrangular, preferably rectangular, pan-like element. Each pan element 2 is designed to be anchored, at two sides thereof, typically at its short sides, particularly at the rear R of the plate-like body or plurality of coplanar plate-like bodies 2, to a couple of dragging and support elements, usually a pair of driving chains CS of a substantially horizontal chain conveyor TS (FIG. 19).

Each pan-like element 1 is anchored at the rear thereof to the chains CS of the chain conveyor TC by means of hanging means, such as a pair of L-shaped brackets 6 (FIGS. 1-3), preferably shaped and sized so as to be equal to one another. Each bracket 6 has a long wing 6a fixed, e.g. by means of screws or socket head screws 6b, to a respective side wall 2b of each plate-like body and a short wing 6c which is substantially aligned with an end of the plate-like body, or preferably with a holding portion 3 thereof. Preferably, in the short wing 6c two slots 6d are formed at which a through slot or hole 6e is formed for a slacky engagement, e.g. through bolts (not shown in the drawings) with a chain of the conveyor TC. With such a structure, each pan-like element 1 is held oriented upwards along the upper forward run of the conveyor TC, whereas along the lower return run each pan-like element is hung and thus it extends downwards with respect to the chains CS.

Chains CS are designed to support an uninterrupted sequence of pan-like elements 1, which along the upper or downward runs of the conveyor TC are closed to one another, and thus, as it is better shown on FIG. 18, have their stakes 4, 5 abutting against respective blocks 3d and 3e of a holding portion of an adjacent pan-like element, whereas its transverse member 3d and its lugs 3a are received in the intermediate L-shaped cross section between two blocks 3d and 3e of the same holding portion of the adjacent pan-like element.

However, a tunnel T is delimited between adjacent and staked support elements, particularly between the main walls 2a facing one another of stacked adjacent support elements. As mentioned above, since the lugs 3a are spaced apart from one another, they delimit an opening or window therebetween, which is designed to allow a drying stream to enter the tunnel in a direction parallel to the main walls 2a of the plate-like body or orthogonally to the feed direction of the conveyor (see in particular FIG. 18).

The chain conveyor TC is mainly inserted in, and extends in a substantially horizontal direction in a hot-air drying oven FO having an open front, so as to have a forward upper and a lower return run, an outer front work end, and an inner end, where the chains are wound around a chain-wheel or wheels CW. At the outer end of the conveyor TC there are provided, as it is known in the art, an upper unit, generally indicated at SL, for kneading, rolling, cutting, loading lasagnas onto the conveyor, and an extraction unit US of dried lasagnas. The chains of the conveyor TC are caused to wind about three front chain-wheels or three pairs of front chain-wheels FCW having a diameter much smaller than that of the chain-wheels CW located at the inner winding about end, thus ensuring a suitable angular displacement between adjacent pan-like elements 1 at the outer end.

As it will be understood, lasagna sheets are supplied one-by-one or in groups of sheet pieces from the unit SL to the zone delimited by two adjacent pan-like elements 1, when adjacent pan-like elements are relatively angularly displaced at one pair of chain wheels FCW. While being loaded lasagna or lasagnas sleep onto the transverse member 3b of the holding portion of the coming pan-like element 1 or the pan-like element arranged upstream with respect to the feeding direction of the conveyor TC, and thus without being damaged or becoming stuck.

Moreover, along the forward and return runs, fans V (see in particular FIGS. 20a and 20b) are provided, e.g. double suction centrifugal fans which are driven by a motor M and designed to generate air streams designed to be blown onto the dough sheets supported by the support elements. Partition walls PD are also provided which are designed to divert the flow and provide tortuous paths and thus turbulence in the stream, thereby ensuring that the support elements are fed with drying air from a number of directions.

To this end, in order to increase turbulence, at least two fans can be provided in the forward and/or return run in order to generate opposite air streams. Thus, heat and humidity are forced to remain inside the oven, otherwise, if all the fans located along the forward or return run are oriented in same feed direction, air would be forced to be discharged from (the front of) the oven.

Advantageously, in the forward and/or return run two fans are provided arranged on either side of the conveyor, thereby feeding air streams both to the free end of the pan-like elements and the end anchored to the conveyor and obtaining an uniform drying effect on the sheet pieces.

Preferably, heating means BR, e.g. a resistor located on the suction duct CA and not on the delivery duct CM of the fans, are also provided. The applicant of the present patent application has found by tests that drying time in intervals can be shortened, as a hot air stream is forced directly onto the product (sheets), and thus a saving up to 60% of the heat energy is obtained.

Referring now to FIGS. 21 to 24, a second embodiment of pan-like element 1a according to the present invention is shown, which is similar to the pan-like element shown in FIGS. 1 to 18, wherein one or more openings, e.g. slots or bores 3f, 2f, respectively, are formed in a face of the L-shaped component of the base element 3a, which, in use, is substantially parallel to the lugs 3a, as well in the main walls 2a of the plate-like body 2.

As it will be understood, this embodiments makes it possible for a drying air stream to be directed both in a direction parallel and orthogonal to the main walls 2a of the plate-like body. According to such an embodiment, one air stream can flow through the tunnel T and also throughout the bores formed in the L-shaped profile of each base element 3c, and thus hit the sheets (which are received between two adjacent and stacked pan-like elements) by passing through the bores formed in the main walls of the main component, thereby increasing the drying efficiency.

The above-described support element is susceptible to numerous modifications and variations within the scope as defined by the claims.

Thus, for example the plate-like elements may be integral with the holding portion/s.

The invention claimed is:

1. A support element configured to be hung, in use, at a dragging and support structure of a sheet material working plant for transporting sheet material throughout working plant, the support element comprising:
    at least one plate body positioned and configured to support the sheet material, and the plate body having a front, a rear, and a front-rear direction;
    a base element secured to the at least one plate body;
    at least one holding portion extending from at least one surface of said at least one plate body;
    a hanger positioned at said rear and configured to engage with the dragging and support structure of the sheet material working plant;
    said at least one holding portion comprising at least two lugs rising from said plate body, or from the base element; and
    a top transverse element extending substantially parallel to said plate body and transverse to the front-rear direction of the plate body so as to enable air to be blown between the lugs and under the top transverse element onto the sheet material on the plate-body,
    wherein each base element is removably securable to an end of said plate body.

2. A support element as claimed in claim 1, wherein said holding portion comprises a plurality of lugs aligned with one another and extending in the same orthogonal direction to said at least one plate body.

3. A support element as claimed in claim 1, wherein said base element comprises an L-shaped intermediate double-winged section terminating at a respective closing block positioned at each end of the L-shaped intermediate double-winged section, said at least one lug rising from a wing of said intermediate section,
    wherein a projecting portion rises from each of said closing block, the projecting portion being parallel and reaching a lower level than said at least one lug.

4. A sheet material working plant comprising a dragging and support structure for transporting sheet material throughout the sheet material working plant, the dragging and support structure comprising the support element of claim 1.

5. A support element configured to be hung, in use, at a dragging and support structure of a sheet material working plant for transporting sheet material throughout the sheet material working plant, the support element comprising:
    at least one plate body positioned and configured to support the sheet material, and the plate body having a front, a rear, and a front-rear direction;
    a base element secured to the at least one plate body;
    at least one holding portion extending from at least one surface of said at least one plate body;
    a hanger positioned at said rear and configured to engage with the dragging and support structure of the sheet material working plant;

said at least one holding portion comprising at least two lugs rising from said plate body, or from the base element; and a top transverse element extending substantially parallel to said plate body and transverse to the front-rear direction of the plate body so as to enable air to be blown between the lugs and under the top transverse element onto the sheet material on the plate-body, wherein said plate body is substantially tubular and has two main substantially flat walls parallel to one another and two side walls connecting said main walls, thereby delimiting a through opening with two air inlet/outlet mouths.

6. A support element as claimed in claim 5, wherein at least one opening is formed in said two main walls.

7. A support element as claimed in claim 6, wherein at least one through opening is formed in said base element, the at least one through opening positioned and configured to receive air such that drying air enters or exits from said plate body.

8. A support element configured to be hung, in use, at a dragging and support structure of a sheet material working plant for transporting sheet material throughout the sheet material working plant, the support element comprising:

at least one plate body positioned and configured to support the sheet material, and the plate body having a front, a rear, and a front-rear direction;

a base element secured to the at least one plate body;

at least one holding portion extending from at least one surface of said at least one plate body;

a hanger positioned at said rear and configured to engage with the dragging and support structure of the sheet material working plant;

said at least one holding portion comprising at least two lugs rising from said plate body, or from the base element; and a top transverse element extending substantially parallel to said plate body and transverse to the front-rear direction of the plate body so as to enable air to be blown between the lugs and under the top transverse element onto the sheet material on the plate-body, wherein said plate body comprises two holding portions, one holding portion being located at the front and the other holding portion at the rear of said plate body, said holding portions being overturned one with respect to the other.

9. A support element configured to be hung, in use, at a dragging and support structure of a sheet material working plant for transporting sheet material throughout the sheet material working plant, the support element comprising:

at least one plate body positioned and configured to support the sheet material, and the plate body having a front, a rear, and a front-rear direction;

a base element secured to the at least one plate body;

at least one holding portion extending from at least one surface of said at least one plate body;

a hanger positioned at said rear and configured to engage with the dragging and support structure of the sheet material working plant;

said at least one holding portion comprising at least two lugs rising from said plate body, or from the base element; and a top transverse element extending substantially parallel to said plate body and transverse to the front-rear direction of the plate body so as to enable air to be blown between the lugs and under the top transverse element onto the sheet material on the plate-body, wherein said hanger comprises a pair of L-shaped brackets, each L-shaped bracket comprising a long wing fixed to a respective side wall of said plate body and a short wing substantially aligned with an end at the rear of said plate body.

* * * * *